(12) United States Patent
Fuse et al.

(10) Patent No.: US 6,699,084 B2
(45) Date of Patent: Mar. 2, 2004

(54) DRIVE SHAFT BEARING STRUCTURE FOR BOAT

(75) Inventors: Tomohiro Fuse, Saitama (JP); Masahiko Tsuchiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/219,660

(22) Filed: Aug. 16, 2002

(65) Prior Publication Data

US 2003/0054712 A1 Mar. 20, 2003

(30) Foreign Application Priority Data

Sep. 18, 2002 (JP) ........................................ 2001-284062

(51) Int. Cl.⁷ .............................................. B63H 23/34
(52) U.S. Cl. ........................................................ 440/83
(58) Field of Search ............................ 440/49, 75, 83, 440/112

(56) References Cited

U.S. PATENT DOCUMENTS 5,352,949 A * 10/1994 Eguchi et al. ......... 310/323.14
5,392,178 A * 2/1995 Nishio et al. ............ 360/99.08

FOREIGN PATENT DOCUMENTS

JP             07112679 A        5/1995

* cited by examiner

Primary Examiner—Stephen Avila
(74) Attorney, Agent, or Firm—Birch, Stewart, Kolasch & Birch, LLP

(57) ABSTRACT

A bearing member for rotatably supporting a drive shaft for driving an impeller on a boat body configured to prevent wearing of an outside circumferential surface of a drive shaft and/or an inside circumferential surface of an inner lace. An inner lace makes contact with an outside circumferential surface of the drive shaft, and an outer lace is disposed on the outside of the inner lace with a rotary body dsiposed therebetween. A connecting member for rotating both the drive shaft and the inner lace is provided between the outside circumferential surface of the drive shaft and the inner lace. The connecting member is a ring-shaped elastic body pressed against the outside circumferential surface of the drive shaft and a side surface of the inner lace. Two bearing members are provided at an interval therebetween, and the connecting member is disposed between the bearing members.

18 Claims, 8 Drawing Sheets

DRIVE SHAFT BEARING STRUCTURE FOR BOAT

CROSS-REFERENCE TO RELATED APPLICATIONS

The present application claims priority under 35 U.S.C. §119 to Japanese Patent Application No. 2001-284062, filed on Sep. 18, 2001, the entire contents thereof are hereby incorporated by reference.

BACKGROUND OF THE INVENTION

1. Field of the Invention

The present invention relates to a drive shaft bearing structure for boat.

2. Description of Background Art

Conventional drive shaft bearing structures for boats are known. One example is shown in FIG. 8 (Japanese Patent Laid-open No. Hei 7-112697).

FIG. 8 of this document shows a drive shaft 1, a driven-side coupler 2 connected to a driving-side coupler of an engine (not shown) fixed to the front end of the drive shaft 1, and an impeller (not shown) fixed to the rear end of the drive shaft 1. Power from the engine is transmitted to the impeller, whereby the impeller is rotationally driven.

The bearing structure includes a bearing body 4 for rotatably supporting the drive shaft 1 relative to a boat body 3.

The bearing body 4 includes a bearing member 5 for rotatably (in this case, rotatably through the bearing body 4) supporting the drive shaft 1 relative to the boat body 3. The bearing member 5 includes an inner lace 5a making contact with an outside circumferential surface of the drive shaft 1 (in the structure shown, an outside circumferential surface of a sleeve 1' rotated as one body with the shaft 1), and an outer lace 5c disposed on the outside of the inner lace 5a with a rotary body 5b therebteween.

In such a bearing structure, in order that the drive shaft 1 (in the structure shown, the sleeve 1', here and hereinafter) can be inserted into and drawn out of the bearing member 5, the outside diameter of the drive shaft 1 is set to be slightly smaller than the inside diameter of the inner lace 5a. Generally, however, the structure is so constituted that the drive shaft 1 and the inner lace 5a are rotated together.

However, with the structure described above, a reaction force from the impeller acts on the drive shaft 1. This reaction force acts in a complicated combination of thrust forces, twisting forces and bending forces. In addition, in considering how the structure is assembled, the clearance between the drive shaft and the inner lace cannot be reduced. Therefore, there are often is the case where the drive shaft 1 and the inner lace 5a are not rotated together, and the outside circumferential surface 1a of the drive shaft 1 and the inside circumferential surface of the inner lace 5a make sliding contact with each other. This results in the outside circumferential surface 1a of the drive shaft 1 and/or the inside circumferential surface of the inner lace 5a being gradually worn.

One of the objects of the present invention to solve the above problems, and to provide a drive shaft bearing structure for boat in which wearing of the inside circumferential surface of the drive shaft and/or the inside circumferential surface of the inner lace can be reduced or prevented.

SUMMARY AND OBJECTS OF THE INVENTION

In order to attain the above object, the structure of the present invention includes a bearing member for rotatably supporting a drive shaft for driving an impeller on a boat body, the bearing member comprising an inner lace making contact with an outside circumferential surface of the drive shaft, and an outer lace disposed on the outside of the inner lace with a rotary body therebtween. Also included is a connecting member for rotating both the drive shaft and the inner lace provided between the outside circumferential surface of the drive shaft and the inner lace.

In second aspect of the present invention, the connecting member of the structure is a ring-shaped elastic body pressed against the outside circumferential surface of the drive shaft and a side surface of the inner lace. Further, a plurality of the bearing members are provided at a spacing or spacings, and the connecting member is disposed between the bearing members.

In addition, in another aspect of the present invention, the connecting member is a ring-shaped elastic body which is disposed in a ring-shaped groove formed in a portion facing to the inner lace of the outside circumferential surface of the drive shaft and which is pressed by the inner lace.

As described above, the drive shaft bearing structure includes a bearing member for rotatably supporting a drive shaft for driving an impeller on a boat body, the bearing member comprising an inner lace making contact with an outside circumferential surface of the drive shaft, and an outer lace disposed on the outside of the inner lace with a rotary body therebetween. Further, a connecting member for rotating both the drive shaft and the inner lace is provided between the outside circumferential surface of the drive shaft and the inner lace. According to this structure, even when a reaction force from the impeller acts on the drive shaft and the reaction force acts as the result of a complicated combination of thrust forces, twisting forces and bending forces, the drive shaft and the inner lace are rotated together by the connecting member.

Therefore, sliding contact between the outside circumferential surface of the drive shaft and the inside circumferential surface of the inner lace is prevented, and premature wearing of the outside circumferential surface of the drive shaft and/or the inside circumferential surface of the inner lace is prevented.

Further, the connecting member is made of a ring-shaped elastic body pressed against the outside circumferential surface of the drive shaft and a side surface of the inner lace. Therefore, it is possible to provide the connecting member without altering the drive shaft and/or the inner lace.

In addition, a plurality of the bearing members are provided at a spacing or spacings. Therefore, the drive shaft can be supported securely and in a stable condition by the plurality of the bearing members. Since the connecting member is disposed between the bearing members, the outside circumferential surface of the drive shaft and a side surface of the inner lace of the bearing member disposed adjacently are favorably pressed against each other by the connecting member. Therefore, sliding contact between the outside circumferential surface of the drive shaft and the inside circumferential surface of the inner lace is prevented more securely, and wearing of the outside circumferential surface of the drive shaft and/or the inside circumferential surface of the inner lace is prevented more securely.

The connecting member can also be a ring-shaped elastic body disposed in a ring-shaped groove formed in a portion facing to the inner lace of the outside circumferential surface of the drive shaft and pressed by the inner lace. In this configuration, the outside circumferential surface of the drive shaft and the inside circumferential surface of the inner lace are also connected directly, and sliding contact between both of the surfaces can be prevented. Therefore, wearing of the outside circumferential surface of the drive shaft and/or the inside circumferential surface of the inner lace is again prevented in a secure manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
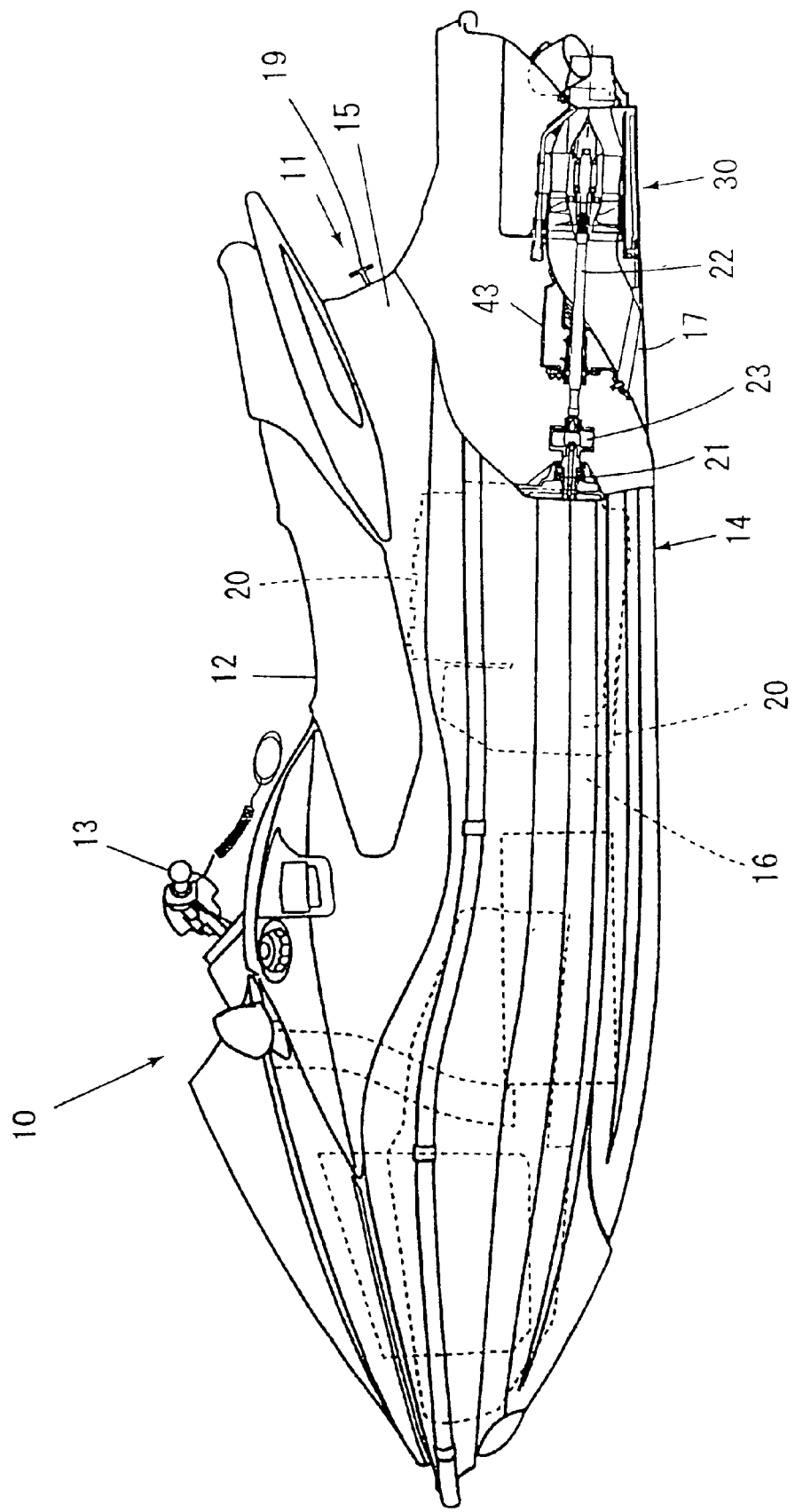
FIG. 1 is a partially cutout general side view of one example of a small-type planning boat using the first embodiment of a drive shaft bearing structure for boat according to the present invention.
Figure 2:
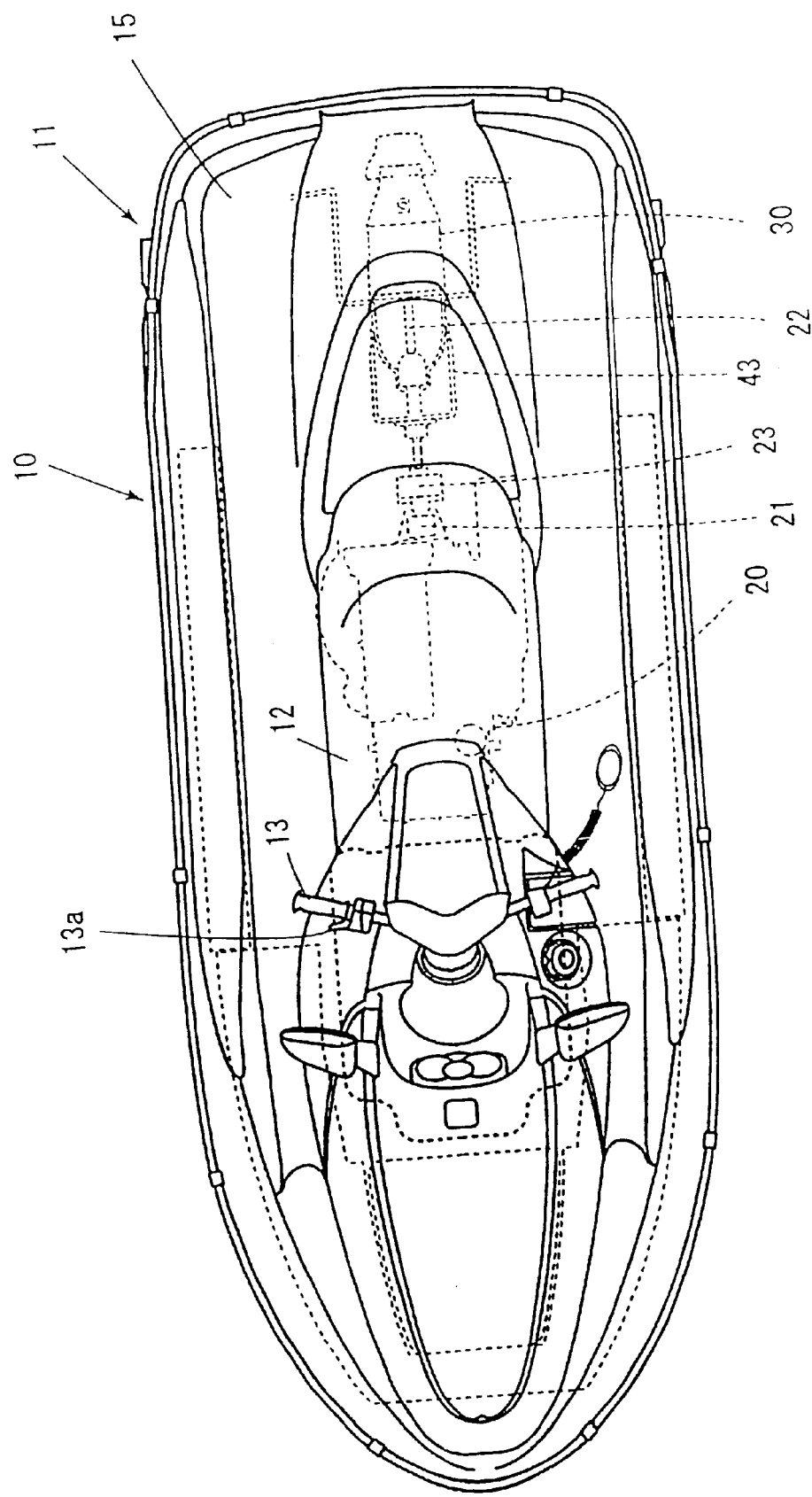
FIG. 2 is a general plan view of the same.

FIG. 1 is a partially cutout general side view showing one example of a small-type planing boat using a first embodiment of a drive shaft bearing structure for boat according to the present invention, whereas FIG. 2 is a general plan view of the same planning boat.

As shown in these figures (mainly FIG. 1), the small-type planing boat 10 is a saddle ride type small-type boat, a passenger is seated on a seat 12 on a boat body 11. The boat can be operated by gripping a rudder handle 13 provided with a throttle lever.

The boat body 11 is a buoyant structure in which a hull 14 and a deck 15 are joined to each other to form a space 16 inside. In the inside of the space 16, an engine 20 is mounted on the hull 14, and a jet pump (jet propulsion pump) 30 as a propelling means driven by the engine 20 is provided at a rear portion of the hull 14.

The jet pump 30 (See FIG. 3) includes an impeller 32 disposed in a conduit 18 extending from a water intake port 17 opening at the bottom of the boat to a nozzle port 31c2 opening at the rear end of the boat body and a deflector 38. A shaft (drive shaft) 22 for driving the impeller 32 is connected to an output shaft 21 (See FIGS. 1 and 4) of the engine 20 through a coupler 23 (a driving-side coupler 23a and a driven-side coupler 23b). Therefore, when the impeller 32 is rotationally driven by the engine 20 through the coupler 23 and the shaft 22, water taken in through the water intake port 17 is jetted from the nozzle port 31c2 through the deflector 38, whereby the boat body 11 is propelled. The driving rotational frequency of the engine 20, namely, the propulsion force of the jet pump 30 is controlled by turning the throttle lever 13a (See FIG. 2) of the operating handle 13. The deflector 38 is connected to the operating handle 13 by an operating wire (not shown), and is operated by turning the handle 13, whereby the course of the boat body 11 can be changed.

FIG. 1 shows a towing hook 19 fixed to a rear portion of the boat body 11, which is utilized at the time of towing an object (a rubber boat or the like).

Figure 3:
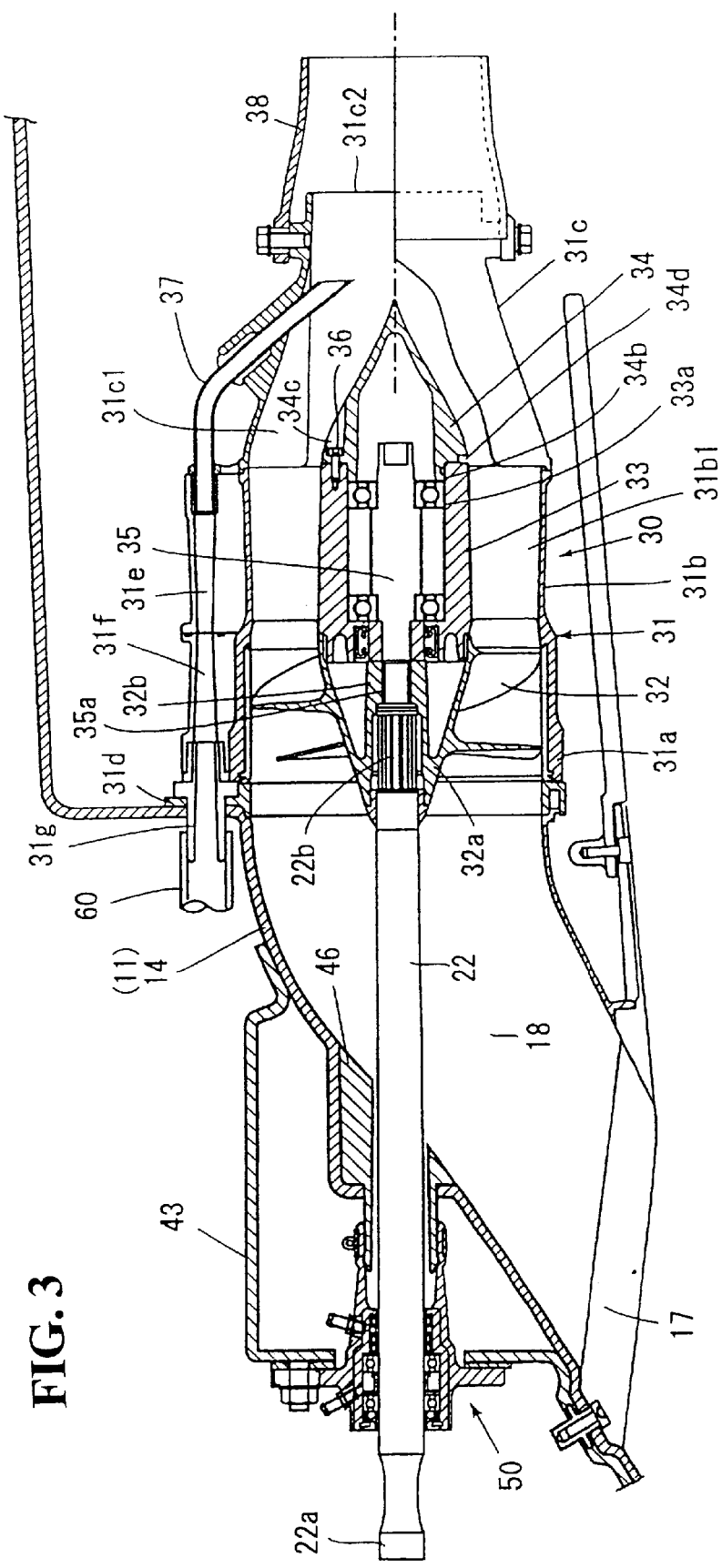
FIG. 3 is a sectional view showing mainly a jet pump 30 and a bearing structure of a drive shaft 22.
Figure 4:
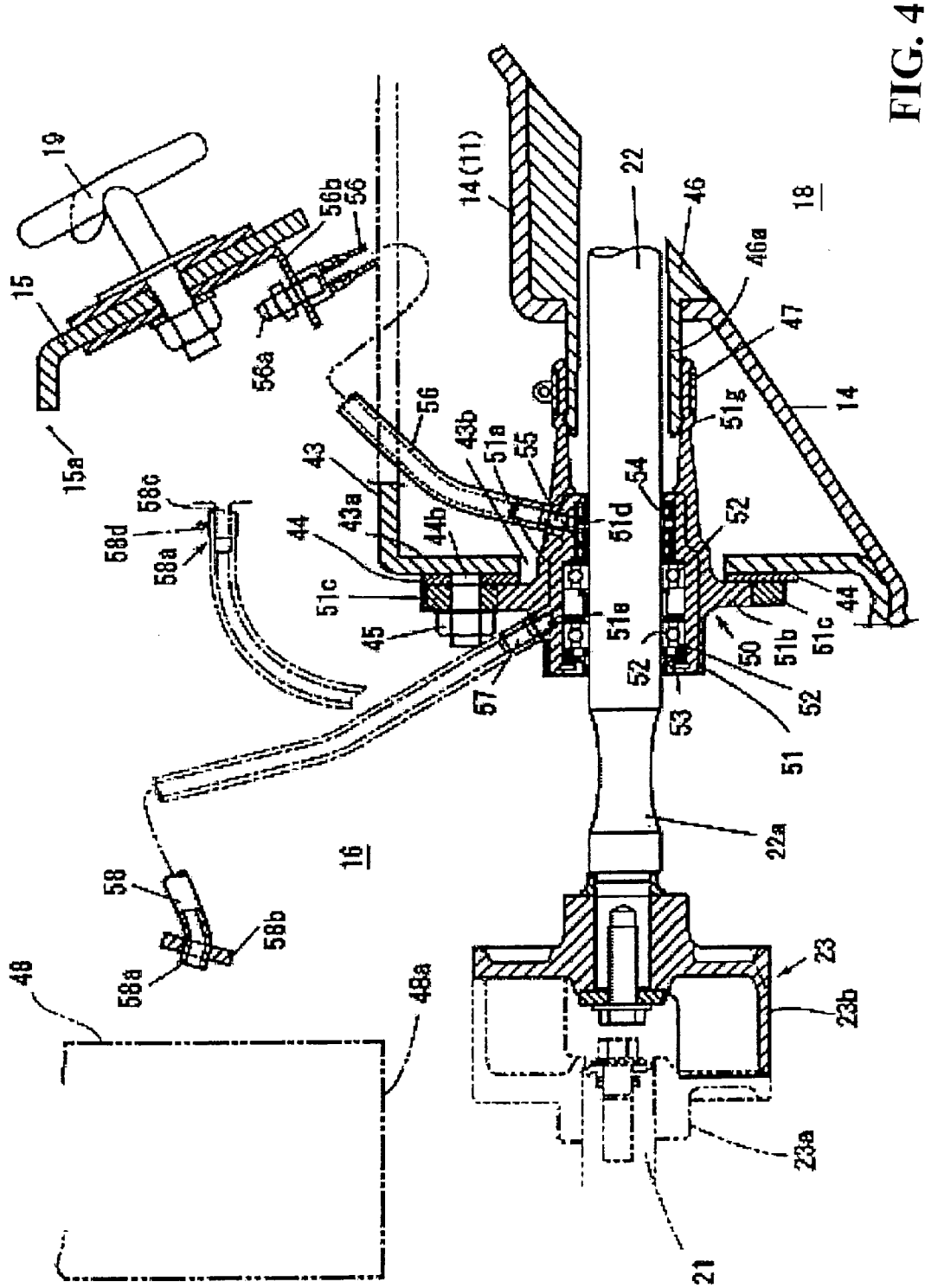
FIG. 4 is a partial enlarged view of FIG. 3.
Figure 5:
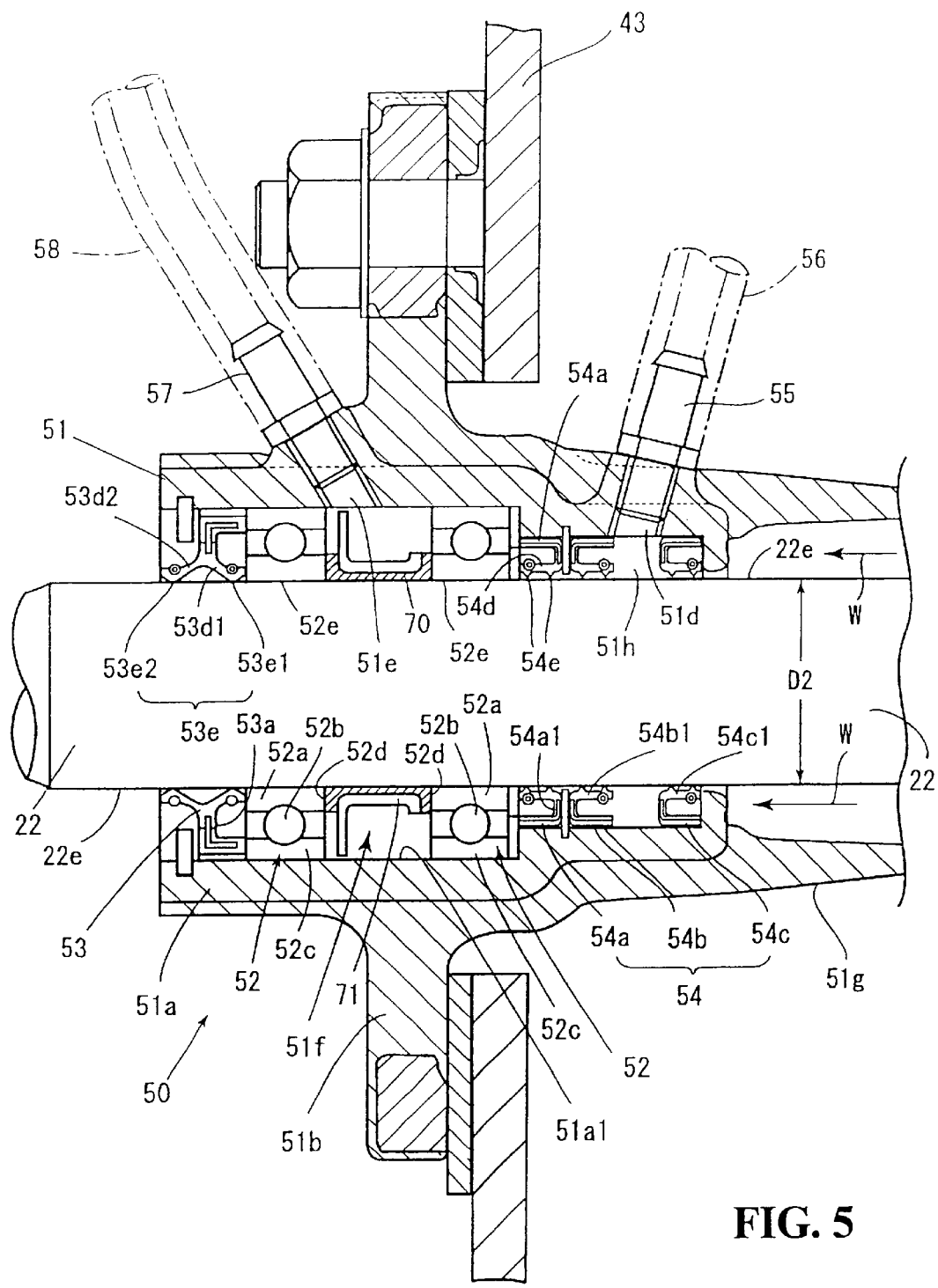
FIG. 5 is a partial enlarged view of FIG. 4.

FIG. 3 is a sectional view showing mainly the jet pump 30 and the bearing structure of the drive shaft 22, FIG. 4 is a partial enlarged view of FIG. 3, and FIG. 5 is further a partial enlarged view of FIG. 4.

As shown in FIG. 3, the jet pump 30 includes a duct 31 forming the conduit 18 communicated to the water intake port 17 provided at a bottom portion of the boat body 11, the impeller 32 disposed in the duct 31, a bearing portion 33 of the impeller provided in the duct 31, and a cap 34 for closing the rear end of the bearing portion 33.

The jet pump 30 is detachably fitted to the hull 14 by fixing a flange portion 31d formed at a front portion of the duct 31 to the hull 14 by bolts (not shown). The duct 31 includes an impeller containing portion 31a, a bearing containing portion 31b, and a nozzle portion 31c, in which the impeller containing portion 31a and the bearing containing portion 31b are formed as one body with each other. The bearing portion 33 is integrally formed in the bearing containing portion 31b through a stationary vane 31b1.

In the impeller 32, a boss portion 32a in the front is engaged with a spline 22b formed at the rear end of the drive shaft 22, and the impeller 32 is rotated together with the drive shaft 22. The shaft 22 has its tip end portion 22a connected to the output shaft 21 of the engine 20 mounted on the boat body 11 through the coupler 23 (See FIG. 4).

On the other hand, a support shaft 35 for supporting a rear portion 32b of the boss portion 32a of the impeller 32 is rotatably supported on the bearing portion 33 through a ball bearing 33a. The support shaft 35 is provided at its tip with a male screw 35a, which is mated with a female screw formed at a boss portion rear portion 32b of the impeller 32, whereby the impeller 32 and the support shaft 35 are connected.

Therefore, in the impeller 32, a front portion of the boss portion 32a is connected to the shaft 22, and the rear portion 32b of the boss portion is connected to the support shaft 35. This causes the impeller 32 to rotate together with the shaft 22 and the support shaft 35.

A front portion of the cap 34 is provided with an insertion portion (tubular portion) 34b for insertion into a rear portion of the bearing portion 33, and is provided with three insertion holes 34c (only one of them is shown) for screws 36 (See FIG. 3). The tubular insertion portion 34b is provided with a fitting groove for an O-ring (not shown).

Therefore, of the cap 34, the O-ring fits into the insertion portion 34b, the insertion portion 34b is inserted (pressed) into a rear portion of the bearing portion 33 as shown in FIG. 3, and the cap 34 fits into the rear portion of the bearing portion 33 by means of the screws 36.

A surface for contact with the bearing portion 33 of the cap 34 is provided with a partial cutout 34d. At the time of maintenance, the screws 36 are removed, and the tip of a tool (for example, screw driver) is put into the cutout 34d, whereby the cap 34 can be easily detached.

A portion facing to the cap 34, of the inside circumferential surface of the nozzle portion 31c, is provided with a stationary vane 31c1 toward the cap 34.

A bilge pipe 37 for discharging bilge water present at the bottom of the boat is inserted in the nozzle portion 31c. The bilge pipe 37 is connected to a bilge pipe 60 in the boat body through conduits 31e, 31f provided at an upper portion of the duct 31 and a joint pipe 31g. The joint pipe 31g on the side of the jet pump 30 and the bilge pipe 60 are detachably connected to each other by pressing-in, and the bilge pipe 60 can be detached from the joint pipe 31g at the time of removing the jet pump 30 from the hull 14.

In addition, the above-mentioned deflector 38 is turnably fit into a rear portion of the nozzle portion 31c.

As shown in FIGS. 3 to 5, a bearing cover 43 is fixed to the hull 14, and a bearing body 50 provided with a rubber damper as a bearing body is fixed to the bearing cover 43.

The bearing body 50 is for rotatably supporting an intermediate portion of the drive shaft 22 to the boat body 11.

The bearing body 50 includes a rubber-made main body 51 constituting a rubber damper portion, a plurality of bearing members (in the structure shown, two ball bearings) 52, 52 contained in the main body 51 and disposed at a spacing therebetween for rotatably supporting the shaft 22 on the boat body 11 through the bearing body 50. A seal member 53 is mounted on the engine side of the bearings 52, and a seal member 54 (in this embodiment, three seal members 54a, 54b, 54c as shown in FIG. 5) is mounted on the jet pump 30 side (the conduit 18 side) of the bearings 52.

The main body 51 includes a tubular portion 51a, and a flange portion 51b integral with the tubular portion 51a. The bearings 52 and the seal members 53 and 54 are mounted in the tubular portion 51a.

As shown in FIG. 5, the seal members disposed on both sides of the bearings 52, namely, the seal member 53 disposed on the engine side and the seal member 54a disposed on the jet pump 30 side make contact with an outside circumferential surface 22e of the drive shaft 22, thereby defining a bearing chamber 51f for containing the bearing member 52. Namely, the bearing chamber 51f is formed as a space surrounded by an inside circumferential surface 51a1 of the tubular portion 51a, the outside circumferential surface 22e of the shaft 22, an inside surface 53a of the seal member 53, and an inside surface 54a1 of the seal member 54a. In addition, the space (51f) forms a grease reservoir between the bearings 52, 52.

The bearing 52 includes an inner lace 52a making contact with the outside circumferential surface 22e of the drive shaft 22, and an outer lace 52c disposed on the outside of the inner lace 52a with a rotary body (in the structure shown, a ball) 52b therebetween. A connecting member 70 for rotating both the drive shaft 22 and the inner lace 52a is provided between the outside circumferential surface 22e of the drive shaft 22 and the inner lace 52a, in the bearing chamber 51f.

The connecting member 70 is comprised of a ring-shaped elastic body (for example, rubber) pressed against the outside circumferential surface 22e of the drive shaft 22 and a side surface 52d of the inner lace 52a, and is disposed between the bearing members 52, 52.

Specifically, in this embodiment, the connecting member 70 is provided integrally with a ring member 71 L-shaped in cross section. For example, a metallic ring member 71 is cast on the rubber-made connecting member 70, whereby both are constituted integrally.

Figure 6:
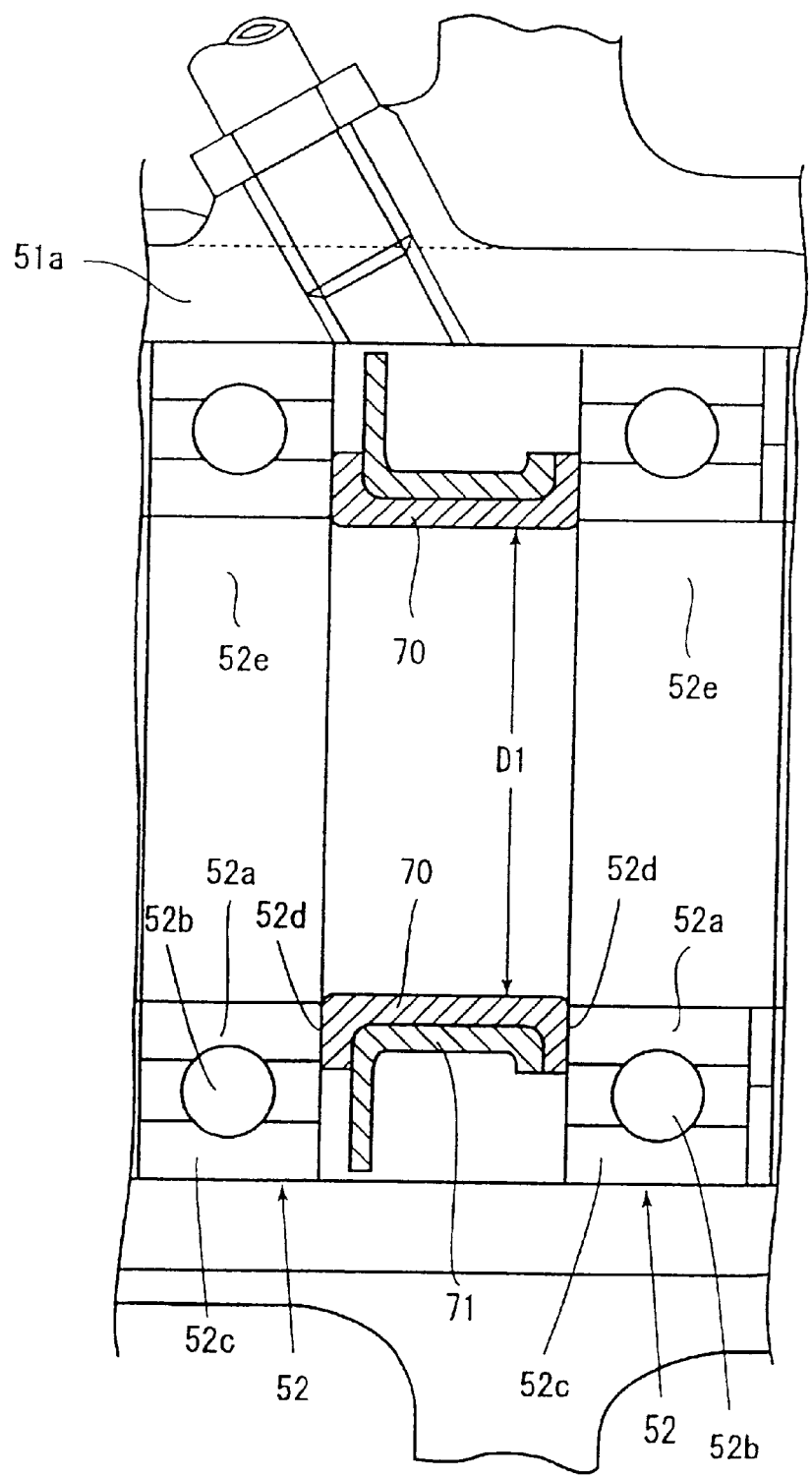
FIG. 6 is a partial enlarged sectional view of a bearing body 50 before insertion of a shaft 22.

As shown in FIG. 6, in the case where the shaft 22 is not inserted in the bearing body 50, the inside diameter D1 of the connecting member 70 is smaller than the outside diameter D2 (See FIG. 5) of the shaft 22. When the shaft 22 is inserted in the bearing body 50 as shown in FIG. 5, the connecting member 70 is pressed by the shaft 22, and is pressed against the outside circumferential surface 22e of the shaft 22 and the side surfaces 52d, 52d of the inner laces 52a, 52a. By this, the shaft 22 and the inner lace 52a are securely rotated together, so that sliding contact between them does not occur.

As shown in FIG. 5, the seal members 53, 54a disposed on both sides of the bearing 52 are so disposed that grease (not shown) in the bearing chamber 51f does not leak through contact portions 53e, 54e of these seal members and the outside circumferential surface 22e of the drive shaft 22.

In this embodiment, the seal member 53 is a ring-shaped seal member roughly Y-shaped in cross section, and includes ring pieces 53d1, 53d2 bifurcated in cross section, and two ring-shaped edge line portions 53e1, 53e2. The edge line portions 53e1, 53e2 make contact with the outside circumferential surface 22e of the shaft 22, and one ring piece 53d1 of the ring pieces 53d1, 53d2 is disposed to come into the bearing chamber 51f. Therefore, when the inside pressure in the bearing chamber 51f is raised, the pressure energizes the ring piece 53d1 coming into the bearing chamber 51f toward the shaft 22, and acts as to strongly press the edge line portion 53e1 against the shaft 22. Therefore, even when the inside pressure in the bearing chamber 51f is raised, a gap is not generated between the edge line portion 53e1 and the outside circumferential surface 22e of the shaft. Accordingly, the grease or air in the bearing chamber 51f does not leak out through a gap between the edge line portion 53e1 and the outside circumferential surface 22e of the shaft.

The seal member 54a is a ring-shaped seal member roughly horseshoe-shaped in cross section. It includes two ring-shaped edge portions 54e, 54e on the shaft 22 side of the ring piece 54d on the inside in the radial direction. The edge line portions 54e, 54e are constituted to make contact with the outside circumferential surface 22e of the shaft 22, and the ring piece 54d is so disposed to come into the bearing chamber 51f. Therefore, when the inside pressure in the bearing chamber 51f is raised, the pressure energizes the ring piece 54d coming into the bearing chamber 51f toward the shaft 22, namely, and acts to strongly press the edge portion 54e against the shaft 22. Therefore, even when the inside pressure in the bearing chamber 51f is raised, no gap is generated between the edge portion 54e and the outside circumferential surface 22e of the shaft. Accordingly, the grease or air in the bearing chamber 51f does not leak out through a gap between the edge portion 54e and the outside circumferential surface 22e of the shaft.

On the other hand, the seal members 54b, 54c are mainly for sealing water W which would come from the exterior of the boat into the boat, and a grease chamber 51h is formed between the seal members 54b, 54c. The constitution of the seal members 54b, 54c is the same as that of the above-mentioned seal member 54a. The seal member 54b is so disposed that its ring piece 54b1 comes into the grease chamber 51h, and the seal member 54c is so disposed that its ring piece 54c1 is directed toward the outside of the grease chamber 51h. Therefore, when the inside pressure in the grease chamber 51h is raised, the grease in the grease chamber 51h displaces or deforms the ring piece 54c1 of the seal member 54c so as to come away from the shaft 22. As such, the grease leaks out to the exterior of the grease chamber 51h through a gap formed between the ring piece 54c1 and the outside circumferential surface 22e of the shaft.

The seal member 54b on the bearing chamber 51f side is so disposed that its ring piece 54b1 comes into the inside of the grease chamber 51h. Therefore, even if the inside pressure in the grease chamber 51h is raised, penetration of the grease or air in the grease chamber 51h into the bearing chamber 51f does not occur. Accordingly, even if water has penetrated into the grease chamber 51h, penetration of the water into the bearing chamber 51f does not occur.

As shown in FIG. 4, the tubular portion 51a of the bearing body 50 forms a rubber cylindrical portion 51g extending toward a cylindrical portion 46a on the side of the boat body described later.

In addition, the flange portion 51b of the bearing body 50 is provided integrally with a metallic reinforcing member 51c.

On the other hand, a front wall 43a of the bearing cover 43 is provided with a hole 43b for inserting the tubular portion 51a of the bearing body 50, and a metallic ring-shaped base 44 is closely adhered to the periphery of the hole 43b by an adhesive. A bolt 44b is integrally planted in the base 44.

The bearing body 50 is fixed to the bearing cover 43 (and therefore, the boat body 11) by inserting the rubber cylindrical portion 51g in the hole 43b of the bearing cover 43, inserting the bolt 44b in the reinforcing member 51c of the flange portion 51b, and mating a nut 45 to the bolt 44b from the inside of the boat body and fastening the flange portion 51b (and therefore, the reinforcing member 51c).

The rear end of the rubber cylindrical portion 51g is connected to the cylindrical portion 46a of a joint rubber 46 fits into the hull 14, is sealed with an adhesive from the side of the conduit 18, and clamped by a ring-shaped clamp 47.

As shown in FIGS. 4 and 5, the cylindrical portion 51a of the bearing body 50 is provided with a grease supply hole 51d communicated to the grease chamber 51h, and a breather hole 51e which communicates to the bearing chamber 51f.

A grease supply hose 56 is connected to the grease supply hole 51d through a connecting pipe 55, and a grease nipple 56a is provided at the tip end of the grease supply hose 56. The grease nipple 56a is fixed to the deck 15 by co-fastening with the above-mentioned towing hook 19 (See FIG. 1) by a fitting fixture 56b, near an opening 15a formed upon opening the seat 12.

Therefore, by opening the seat 12, grease can be easily supplied from the grease nipple 56a into the grease chamber 51h through the grease supply hose 56.

A breather hose (for example, a rubber tube) 58 made of an expandable elastic member (for example, rubber) is detachably connected to the breather hole 51e through a connecting pipe 57. The tip end 58a of the breather hose 58 is fixed to an appropriate portion of the boat body 11 (the hull 14 or the deck 15) by a fitting fixture 58b.

Therefore, when the grease or air in the bearing chamber 51f expand due to a temperature rise in the bearing chamber 51f, the expanded portion of the grease or air is released into the breather hole 51e, the connecting pipe 57 and the breather hose 58. Therefore, the seal members 53, 54a will not be excessively deformed due to the rise in the inside pressure in the bearing chamber 51f. As such, the seal members 53, 54a disposed on both sides of the bearing 52 retain there capability to prevent grease (not shown) in the bearing chamber 51f from leaking out through the contact portions 53e, 54e with the outside circumferential surface 22e of the drive shaft 22.

As shown in FIG. 4, the tip end 58a of the breather hose 58 is opened into the boat inside 16 on the upper side of the bearing chamber 51f. The tip end 58a is disposed on the upper side of a boat inside opening port 48a of an intake duct 48 for introducing air into the boat inside 16.

Since the breather hose 58 is formed of an expandable material such as rubber tube, by closing its opening end 58a by fitting the opening end 58a to a plug 58c provided at an appropriate portion in the boat as indicated by imaginary lines in FIG. 4, penetration of water through the opening end 58a can be prevented securely. In this case, even if the end portion 58a is closed, the breather hose 58 expands or contracts according to the inside pressure in the bearing chamber. This ensures that the release of the grease or air in the bearing chamber into the breather hose 58, and its return from the breather hose 58, are not hampered. Also shown is a tie wrap 58a for fastening the end portion 58a to the plug 58c.

Incidentally, since the breather hose 58 is detachably connected to the connecting pipe 57, the breather hose 58 can be detached, and grease can easily be charged into the bearing chamber 51f through the connecting pipe 57 at the time of maintenance.

According to the drive shaft bearing structure for boat as described above, the following actions or effects can be obtained.

(a) The bearing member 52 for rotatably supporting the drive shaft 22 for driving the impeller 32 on the boat body 11 is provided, the bearing member 52 including the inner lace 52a making contact with the outside circumferential surface 22e of the drive shaft 22, and the outer lace 52c disposed on the outside of the inner lace 52a with the rotary body 52b therebetween. Also included is the connecting member 70 for rotating both the drive shaft 22 and the inner lace 52a provided between the outside circumferential surface 22e of the drive shaft 22 and the inner lace 52a. Therefore, even when a reaction force from the impeller 32 acts on the drive shaft is a complicated combination of thrust forces, twisting forces and bending forces, the connecting member 70 causes the drive shaft 22 and the inner lace 52a to both rotate together.

Therefore, sliding contact between the outside circumferential surface 22e of the drive shaft 22 and the inside circumferential surface 52e (See FIG. 5) of the inner lace 52a is prevented, and the outside circumferential surface 22e of the drive shaft 22 and/or the inside circumferential surface 52e of the inner lace 52a is not worn.

(b) Since the connecting member 70 includes the ring-shaped elastic body pressed against the outside circumferential surface 22e of the drive shaft 22 and the side surface 52d of the inner lace 52a, the connecting member 70 can be provided without any special alterations or changes to the drive shaft 22 and/or the inner lace 52a.

(c) Since a plurality (in this embodiment, two) of the bearing members 52 are provided at a spacing, the drive shaft 22 can be securely supported by the plurality of the bearing members 52. In addition, since the connecting member 70 is disposed between the bearing members 52, the outside circumferential surface 22e of the drive shaft 22 and the side surfaces 52d, 52d of the inner lace 52a of the adjacent bearing members 52, 52 are favorably pressed against each other through the connecting member 70.

Therefore, sliding contact between the outside circumferential surface 22e of the drive shaft 22 and the inside circumferential surface 52e of the inner lace 52a is prevented more securely. In addition, wearing of the outside circumferential surface 22e of the drive shaft 22 and/or the inside circumferential surface 52e of the inner lace 52a is prevented more securely.

(d) The bearing body 50 includes the bearing member 52 for rotatably supporting the drive shaft 22, the bearing chamber 51f for containing the bearing member 52, and the seal members 53, 54a disposed on both sides of the bearing member 52 and making contact with the outside circumferential surface 22e of the drive shaft 22 to define the bearing chamber 51f, and a breather passage (51e, 57, 58) is communicated to the bearing chamber 51f. Therefore, even when the temperature in the bearing chamber 51f rises and the grease or air in the bearing chamber 51f expands, the expanded portion of the grease or air is released into the breather passage (51e, 57, 58). As a result, the rise of the inside pressure in the bearing chamber 51f is prevented, or at a minimum, considerably suppressed.

Therefore, the seal members 53, 54a are not deformed by the inside pressure in the bearing chamber 51f. Hence, no gap is created between the seal members 53, 54a and the outside circumferential surface 22e of the shaft. Therefore, with no gap between the seal members 53, 54a and the outside circumferential surface 22e of the shaft, the grease or air in the bearing chamber 51f cannot leak out to the exterior of the chamber.

In addition, the grease or air released into the breather passage due to the rise in the temperature in the bearing chamber 51f returns into the bearing chamber 51f when the running of the boat 10 is stopped and the temperature in the bearing chamber 51f is lowered.

Therefore, according to the drive shaft bearing structure for boat, excessive deformation of the seal members 53, 54a, which would otherwise occur due to the rise in the inside pressure in the bearing chamber 51f, is prevented. At the same time, even when running and stopping of the boat are repeated, and rise and fall of the temperature in the bearing chamber (hence, expansion and contraction of the grease or air in the bearing chamber 51f) are repeated, the amount of the grease leaking out of the bearing chamber 51f is eliminated or dramatically lowered. As a result, according to the bearing structure, long term wearing of the bearing 52 itself is prevented.

(e) Since the seal members 53, 54a are disposed so that the grease in the bearing chamber 51f does not leak out through the contact portions between the seal members 53, 54a and the outside circumferential surface 22e of the drive shaft 22, leaking of the grease from the inside of the bearing chamber 51f is prevented more securely.

If no measure is provided, there may be the risk that the seal members 53, 54a might be excessively deformed due to the rise in the inside pressure in the bearing chamber 51f. However, according to the bearing structure of this embodiment, the breather passage (51e, 57, 58) communicates with the bearing chamber 51f, and excessive deformation can be prevented.

Namely, according to this bearing structure, the seal members 53, 54a are disposed so that the grease in the bearing chamber 51f does not leak out through the contact portions between the seal members 53, 54a and the outside circumferential surface 22e of the drive shaft 22. Accordingly, leakage of the grease from the inside of the bearing chamber 51f is prevented more securely, and, in addition, excessive deformation of the seal members 53, 54a due to the rise in the inside pressure in the bearing chamber 51f is prevented. As a result, according to this bearing structure, long term wear of the bearing 52 itself is prevented.

(f) When the end portion 58a on the opposite side of the bearing chamber 51f, of the breather passage is opened, even if the temperature in the bearing chamber 51f rises and the grease or air in the bearing chamber 51f expands, the expanded portion of the grease or air leaks more smoothly toward the breather passage. As such, the rise in the inside pressure in the bearing chamber 51f is controlled and restrained.

Also, since the end portion 58a of the breather passage on the opposite side of the bearing chamber is open into the boat inside 16 on the upper side of the bearing chamber 51f, the grease released into the breather passage due to the rise in the temperature in the bearing chamber 51f does not leak out through the end portion 58a of the breather passage. Instead, it returns securely into the bearing chamber 51f when the the boat 10 is stopped and the temperature in the bearing chamber 51f drops.

(g) Since the end portion 58a on the opposite side of the bearing chamber is disposed on the upper side of the boat inside opening port 48a of the intake duct 48 for introducing air into the boat inside 16, water which may be scattered after being taken into the boat inside 16 together with air from the intake duct 48, only with difficulty can water enter into the breather passage through the end portion 58a. Therefore, only rarely will water drops be able enter the bearing chamber 51f through the breather passage.

(h) In the case where the opening end 58a of the breather hose 58 is closed by the plug 58c as indicated by imaginary lines in FIG. 4, penetration of water through the opening end 58a can be prevented more securely. In this case, even when the end portion 58a is closed, the breather hose 58 expands and contracts according to the inside pressure in the bearing chamber. Thus, the release of the grease or air from the bearing chamber into the breather hose 58, and the return of the grease or air from the breather hose 58 are not hampered.

(i) Since the breather passage includes the breather hose 58 detachable relative to the bearing body 50 and the grease can be poured into the bearing chamber 51f by detaching the breather hose 58, there is no need to remove the drive shaft 22 from the bearing body 50 when adding grease to the bearing chamber 51f. Therefore, the operation of grease-charging is made easy.

(j) Since two bearing members 52, 52 are disposed at an interval in the bearing chamber 51f and a grease reservoir is formed between the bearing members 52, 52, a large amount of grease can be charged into the bearing chamber 51f from the grease reservoir. Therefore, long term wear of the bearing 52 itself is prevented further.

Figure 7:
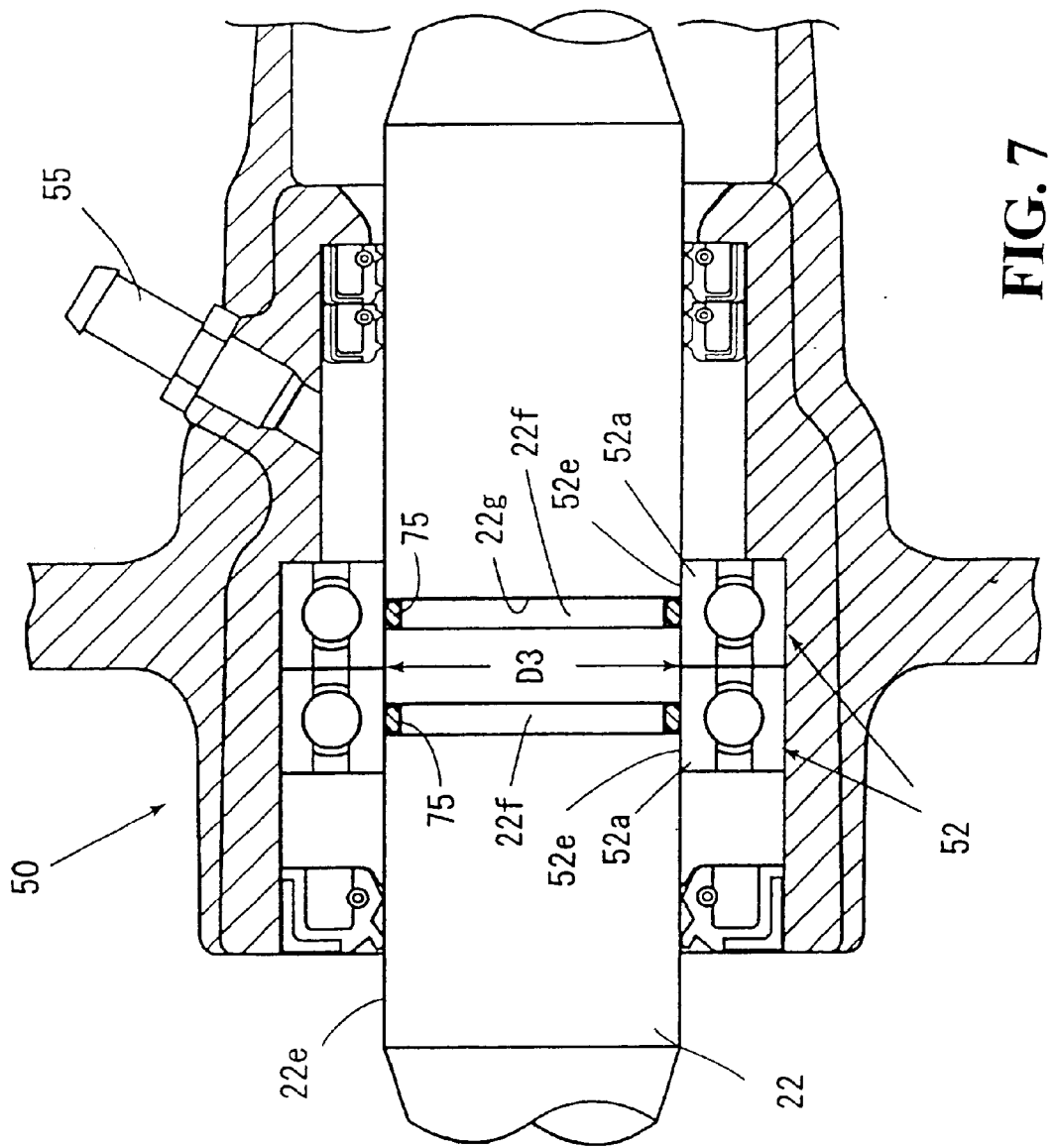
FIG. 7 is a view showing the second embodiment of the drive shaft bearing structure for boat according to the present invention.
Figure 8:
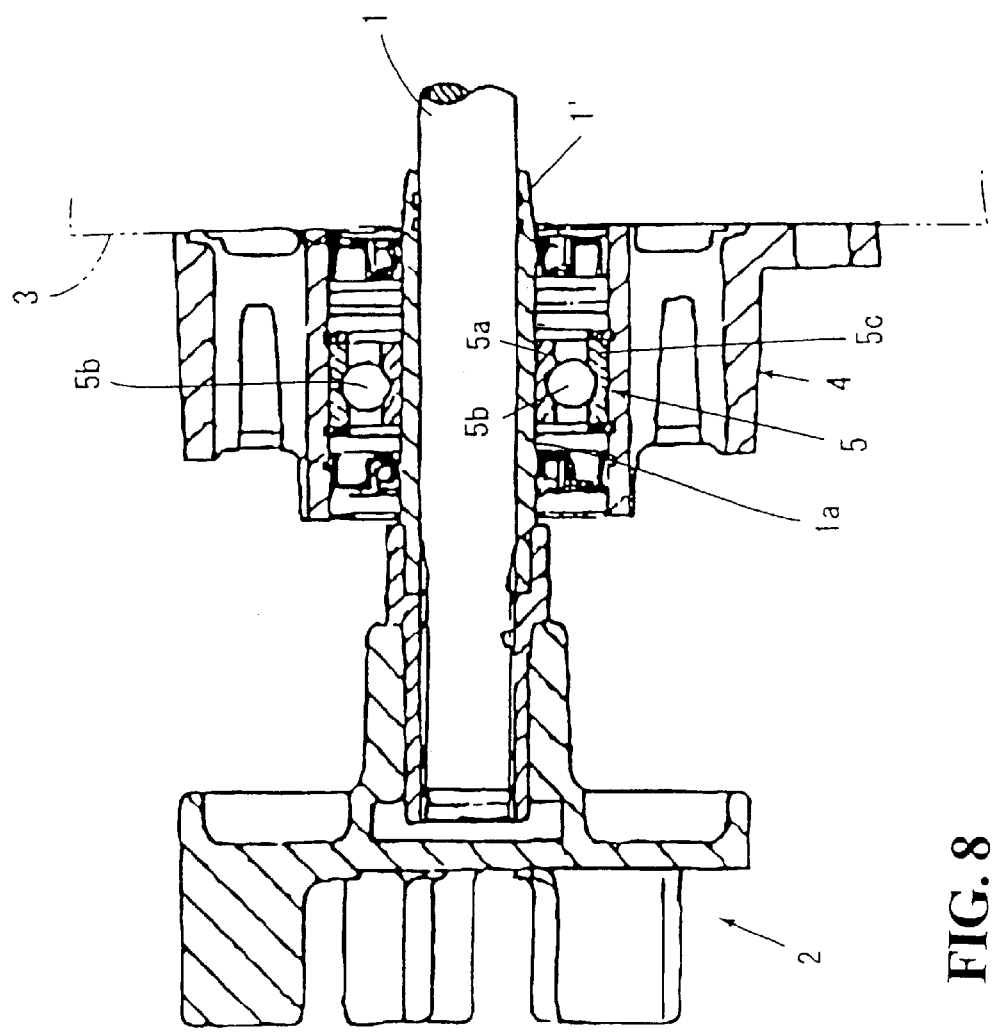
FIG. 8 is an illustration of the prior art.

FIG. 7 shows a second embodiment of the drive shaft bearing structure for boat according to the present invention. In FIG. 7, the portions which are equivalent to those in the first embodiment are denoted by the same symbols.

The present embodiment differs from the first embodiment mainly and only in that the connecting member 75 is a ring-shaped elastic body which is disposed in a ring-shaped groove 22f formed in a portion facing to the inner lace 52a, of the outside circumferential surface 22e of the drive shaft 22, and is pressed by the inner lace 52a.

In this embodiment, two bearings 52 are disposed adjacently to each other, ring-shaped grooves 22f are formed in the portions facing to the inner laces 52a, 52a, of the outside circumferential surface 22e of the drive shaft 22, and O-rings constituting the connecting members 75 are fit into the grooves 22f, 22f.

When the shaft 22 is not inserted in the bearing body 50, the outside diameter of the connecting member 75 fitted in the groove 22f is greater than the inside diameter D3 of the inner lace 52a. When the shaft 22 is inserted in the bearing body 50, as shown in FIG. 7, the connecting member 75 is pressed by the inner lace 52a against the inside circumferential surface of the groove 22f of the shaft 22 and the inside circumferential surface 52e of the inner lace 52a. As such, the shaft 22 and the inner lace 52a securely rotate together, and sliding contact between both of them is prevented.

Therefore, with this second embodiment, the positive effect (a) of the first embodiment as described earlier, is also achieved.

In addition, according to this second embodiment, the connecting member 75 is a ring-shaped elastic body which is disposed in the ring-shaped groove 22f formed in the portion facing to the inner lace 52a, of the outside circumferential surface 22e of the drive shaft 22, and is pressed by the inner lace 52a. Therefore, the outside circumferential surface (the bottom surface and both side surfaces 22g of the groove 22f) of the drive shaft 22 and the inside circumferential surface 52e of the inner lace 52a are connected more directly. Accordingly, sliding contact between the surfaces 22e, 52e is prevented securely. Therefore, wearing of the outside circumferential surface 22e of the drive shaft 22 and/or the inside circumferential surface 52e of the inner lace 52a is prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A drive shaft bearing structure for boat, comprising:
   a bearing member for rotatably supporting a drive shaft for driving an impeller on a boat body, said bearing member comprising an inner lace making contact with an outside circumferential surface of said drive shaft, and an outer lace disposed on the outside of said inner lace with a rotary body therebetween; and
   a connecting member for rotating both said drive shaft and said inner lace provided between said outside circumferential surface of said drive shaft and said inner lace, the connecting member being a ring-shaped elastic body pressed against said outside circumferential surface of said drive shaft and a side surface of said inner lace.

2. The drive shaft bearing structure for boat as set forth in claim 1, wherein a plurality of said bearing members are provided at a spacing or spacings, and said connecting member is disposed between said bearing members.

3. The drive shaft bearing structure for boat as set forth in claim 1, wherein said connecting member is disposed in a ring-shaped groove formed in a portion facing to said inner lace of said outside circumferential surface of said drive shaft and which is pressed by said inner lace.

4. The drive shaft bearing structure for boat as set forth in claim 2, further comprising a Y-shaped seal member and a plurality of horseshoe-shaped seal members for preventing grease in the bearing member from leaking out of a bearing chamber.

5. The drive shaft bearing structure for boat as set forth in claim 4, wherein said Y-shaped seal member and said horseshoe-shaped seal members are provided in a tubular portion of said bearing member.

6. The drive shaft bearing structure for a boat as set forth in claim 4, wherein said bearing chamber is formed in a space at least partly surrounded by an inside surface of the Y-shaped seal member and an inside surface of one of said plurality of said horseshoe-shaped seal members.

7. The drive shaft bearing structure for a boat as set forth in claim 6, wherein another of said plurality of horseshoe-shaped seal members has an inside surface facing a rear of the boat for preventing water from entering the bearing chamber.

8. The drive shaft bearing structure for a boat as set forth in claim 1, wherein the connecting member is made of an elastic material and is provided integrally with a metallic L-shaped ring member, and a diameter of the connecting member is smaller than a diameter of the drive shaft.

9. The drive shaft bearing structure for a boat as set forth in claim 3, further comprising horseshoe-shaped seal members being disposed forward and aft of the bearing member.

10. A drive shaft bearing structure for boat, comprising:
    a bearing member disposed within a tubular portion of bearing body for rotatably supporting a drive shaft for driving an impeller on a boat body, said bearing member comprising an inner lace making contact with an outside circumferential surface of said drive shaft, and an outer lace disposed on the outside of said inner lace with a rotary body therebetween; and
    a connecting member for rotating both said drive shaft and said inner lace provided between said outside circumferential surface of said drive shaft and said inner lace, the connecting member being made of an elastic material and being provided integrally with a metallic L-shaped ring member,
    wherein a diameter of the connecting member is smaller than a diameter of the drive shaft.

11. The drive shaft bearing structure for boat as set forth in claim 10, wherein said connecting member is a ring-shaped elastic body pressed against said outside circumferential surface of said drive shaft and a side surface of said inner lace.

12. The drive shaft bearing structure for boat as set forth in claim 11, wherein a plurality of said bearing members are provided at a spacing or spacings, and said connecting member is disposed between said bearing members.

13. The drive shaft bearing structure for boat as set forth in claim 10, wherein said connecting member is a ring-shaped elastic body which is disposed in a ring-shaped groove formed in a portion facing to said inner lace of said outside circumferential surface of said drive shaft and which is pressed by said inner lace.

14. The drive shaft bearing structure for boat as set forth in claim 11, further comprising a Y-shaped seal member and a plurality of horseshoe-shaped seal members for preventing grease in the bearing member from leaking out of a bearing chamber.

15. The drive shaft bearing structure for boat as set forth in claim 14, wherein said Y-shaped seal member and said horseshoe-shaped seal members are provided in a tubular portion of said bearing member.

16. The drive shaft bearing structure for a boat as set forth in claim 14, wherein said bearing chamber is formed in a space at least partly surrounded by an inside surface of the Y-shaped seal member and an inside surface of one of said plurality of said horseshoe-shaped seal members.

17. The drive shaft bearing structure for a boat as set forth in claim 16, wherein another of said plurality of horseshoe-shaped seal members has an inside surface facing a rear of the boat for preventing water from entering the bearing chamber.

18. The drive shaft bearing structure for a boat as set forth in claim 13, further comprising horseshoe-shaped seal members being disposed forward and aft of the bearing member.

* * * * *